United States Patent [19]
Ooka et al.

[11] Patent Number: 6,144,368
[45] Date of Patent: Nov. 7, 2000

[54] PORTABLE INFORMATION-PROCESSING APPARATUS HAVING A MANUAL OPERATION MEMBER

[75] Inventors: Satoshi Ooka; Yoshinori Kamikawa; Tomomi Murayama, all of Tokyo, Japan

[73] Assignee: Kabushiki Kaisha Toshiba, Kawasaki, Japan

[21] Appl. No.: 08/921,719

[22] Filed: Sep. 2, 1997

[30] Foreign Application Priority Data

Sep. 20, 1996 [JP] Japan .................................. 8-250151

[51] Int. Cl.[7] ...................................................... G09G 5/00
[52] U.S. Cl. .......................................... 345/161; 345/157
[58] Field of Search .................... 345/156, 161, 345/152; 349/153; 257/700

[56] References Cited

U.S. PATENT DOCUMENTS

| | | | |
|---|---|---|---|
| 4,470,668 | 9/1984 | Inoue et al. .............................. | 349/153 |
| 4,720,709 | 1/1988 | Imamura et al. ........................ | 345/152 |
| 5,572,237 | 11/1996 | Crooks et al. ........................... | 345/156 |
| 5,786,806 | 7/1998 | Fester ....................................... | 345/161 |
| 5,986,338 | 11/1999 | Nakajima ................................. | 257/700 |

*Primary Examiner*—Steven J. Saras
*Assistant Examiner*—Tewolde Mengisteab
*Attorney, Agent, or Firm*—Finnegan, Henderson, Farabow, Garrett, & Dunner, L.L.P

[57] ABSTRACT

A portable information-processing apparatus comprising a housing having a first wall and a second wall opposing the first wall. A first manual operating member is provided on the first wall and exposed. A second manual operating member is provided on the second wall, is exposed, and facing away from the first manual operating member. In the housing there is provided a reinforcing plate for receiving the pressure which is generated when the first manual operating member is operated. The reinforcing member is located between the first and second operating members and supported by the first wall. The first and second manual operating members are supported by the first wall. The reinforcing plate is placed apart from the second manual operating member, forming a gap. The second wall has a projection which abuts on the reinforcing plate.

25 Claims, 9 Drawing Sheets

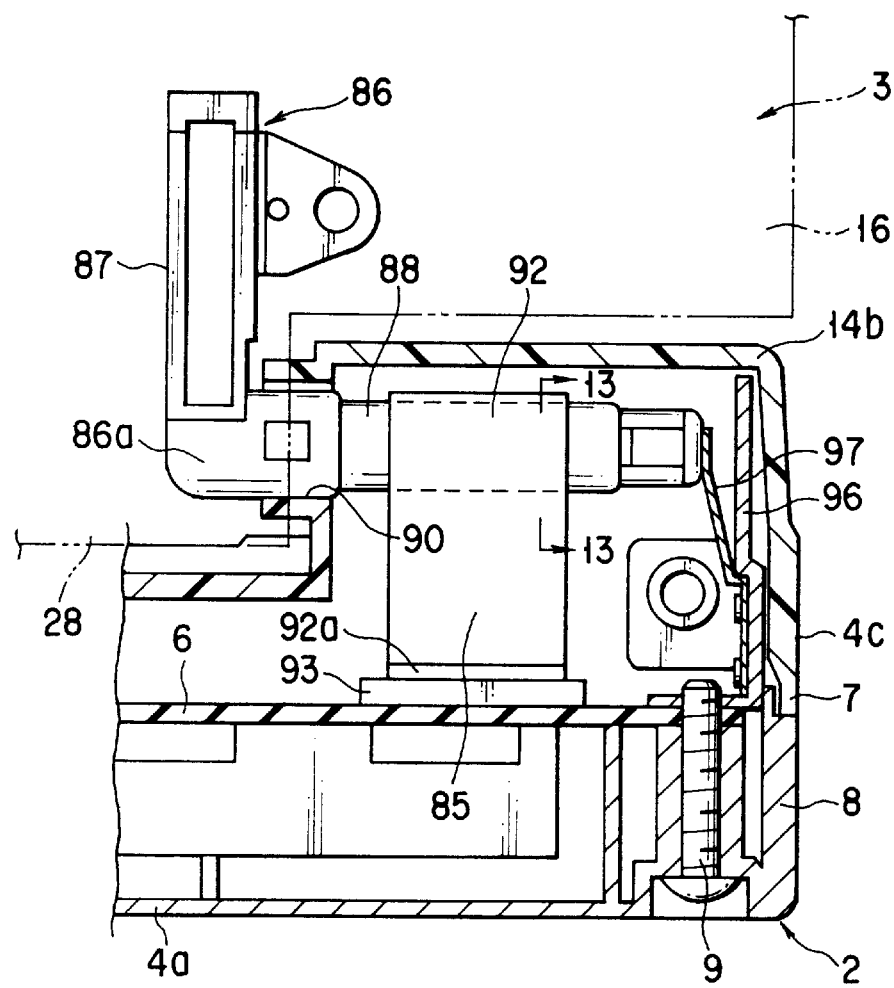
F I G. 12
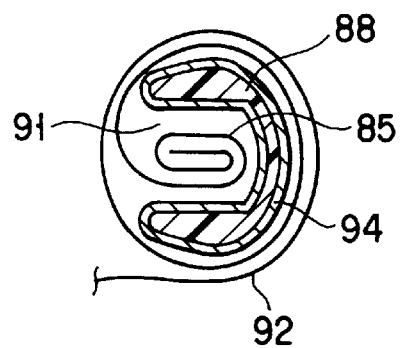
F I G. 13

PORTABLE INFORMATION-PROCESSING APPARATUS HAVING A MANUAL OPERATION MEMBER

BACKGROUND OF THE INVENTION

The present invention relates to a portable information-processing apparatus such as a portable computer having a display unit, and more particularly to a display-unit housing which has a pointing stick, a click switch button, and the like.

Portable computers developed very recently have a housing and a display unit, both reduced in size to meet the demand made in the market. The smaller the housing, the smaller the component-mounting space available in the housing. It has therefore become difficult to arrange all of the required functional components within the housing.

In the case of a portable computer small enough to be put into a suit pocket, the keyboard occupies the entire upper surface of the housing. It is therefore impossible to arrange a pointing stick, a click switch button and the like on the upper surface of the housing. This is why a pointing stick, a click button and the like are mounted on the display unit.

The display unit is supported on the housing and can rotate between a first position and a second position. When rotated to the first position, the display unit covers the keyboard. When rotated to the second position, it exposes the keyboard. The display unit comprises a liquid crystal display (LCD) and a housing incorporating the LCD. The LCD has a screen for displaying characters, images and the like. The housing is made of synthetic resin and comprises a front wall and a rear wall. The front wall has an opening, through which the screen of the LCD is exposed. The rear wall opposes the front wall.

The pointing stick is arranged on the front wall, located near the opening thereof. The click switch button is mounted on the rear wall of the housing. That is, the pointing stick and the click switch button are positioned in back-to-back relationship. A user can therefore operate the pointing stick with the thumb and the click switch button with the forefinger or middle finger.

With the conventional portable computer, the pointing stick and the click switch (actuated when the click switch button is pushed) are supported by the same support plate. More precisely, the pointing switch and the click switch are mounted on the front and back of the support plate, respectively. The support plate is fastened by screws to the rear wall of the housing. The support plate receives a pressure every time the user pushes the click switch button and transmits the pressure to the housing.

The conventional portable computer is made so small and light that it is next to impossible to reduce its wall thickness further. As a consequence, the housing can hardly be sufficiently rigid. The housing may be twisted when the user pushes the click switch button. Twisting of the housing, if any, is transmitted to the support plate which supports the pointing stick. Here is a problem. The pointing stick is designed to detect the strain it exerts on the support plate when the user operates it with a finger tip, thereby to move a pointer to a desired position on the screen of the display unit. The pointing stick, which is mounted on the support plate, detects the twisting of the housing as a strain. Consequently, the pointer is inevitably moved on the screen though the pointing stick is not operated at all.

Usually, the user pushes the click switch button after operating the pointing stick. To push the click switch button with the forefinger or middle finger, the user touches the front wall with the thumb. That is, the user pinches the housing with the thumb and either the forefinger or the middle finger. When the housing is pinched, the front wall is deformed because it is thin. The deforming of the front wall is transmitted to the support plate. The pointing stick, which is mounted on the support plate, detects this deforming as a strain. Also in this case, the pointer is inevitably moved on the screen though the user does not operate the pointing stick at all.

To prevent such an undesired moving of the pointer, the support plate can be made thicker or have ribs to become rigid enough not to be influenced by twisting of the housing of deforming of the front wall. If the support plate is made thicker or provided with ribs, however, it must be a die-cast molding and more expensive, ultimately raising the manufacturing cost of the portable computer. If the support plate has ribs, the ribs will decrease the space provided in the housing to accommodate various components.

Namely, various problems arise because both the pointing stick and the click switch are mounted the support plate.

BRIEF SUMMARY OF THE INVENTION

The present invention has been made in view of the foregoing. Its object is to provide a portable information-processing apparatus which has a reinforcing plate of a simple structure and which makes virtually no operating errors.

To attain the object, there are provided various portable information-processing apparatuses according to the invention.

According to a first aspect of the invention, there is provided a portable information-processing apparatus comprising: a housing having a first wall and a second wall opposing the first wall; first manual operating means provided on the first wall and exposed; second manual operating means provided on the second wall, exposed and facing away from the first manual operating means; and a reinforcing plate located between the first and second manual operating means and supported on the first wall, for receiving a pressure generated when the first manual operating means is operated. The first and second manual operating means are supported by the first wall, the reinforcing plate opposes the second manual operating means and spaced apart therefrom, forming a gap, and the second wall has a projection abutting on the reinforcing plate.

The reinforcing plate receives the pressure applied to the first manual operating means when the first manual operating means is operated. The reinforcing plate transmits the pressure to the housing. The reinforcing plate may be bent, and the twisting of the housing may be transmitted to the reinforcing plate. Nonetheless, the bending of the reinforcing plate or the twisting of the housing is hardly transmitted to the housing, because a gap is provided between the reinforcing plate and the second manual operating means.

Since the second wall is connected to the reinforcing plate by the projection, the reinforcing plate receives any pressure that is applied to the second wall. Therefore, the second wall is hardly bent or twisted, and the function of the manual operating means is hardly influenced by an external force applied to the second wall. Hence, the reinforcing plate need not be designed to be more rigid, and is therefore simple in structure.

According to a second aspect of the invention, there is provided a portable information-processing apparatus comprising: a box-shaped housing including a housing body having a first wall and a cover coupled to the housing body and having a second wall opposing the first wall; first manual operating means provided on the first wall and exposed; second manual operating means provided on the second wall, exposed and facing away from the first manual operating means; and a reinforcing plate located between the first and second manual operating means, for receiving a pressure generated when the first manual operating means is operated. The reinforcing plate and the first and second manual operating means are supported by the first wall, and the reinforcing plate opposes the second manual operating means and spaced apart therefrom, forming a gap, and the second wall has a projection aligned with the second manual operating means and abutting on the reinforcing plate.

The reinforcing plate receives the pressure applied to the first manual operating means when the first manual operating means is operated. The reinforcing plate transmits the pressure to the housing body. The reinforcing plate may be bent, and the twisting of the housing may be transmitted to the reinforcing plate. Nonetheless, the bending of the reinforcing plate or the twisting of the housing body is hardly transmitted to the housing, because a gap is provided between the reinforcing plate and the second manual operating means.

Since the second wall of the cover is connected to the reinforcing plate by the projection, the reinforcing plate receives any pressure that is applied to the cover to press the second wall. Therefore, the second wall is hardly bent or twisted, and the function of the manual operating means is hardly influenced by an external force applied to the second wall. Hence, the reinforcing plate need not be designed to be more rigid, and is therefore simple in structure.

According to a third aspect of the invention, there is provided a portable information-processing apparatus, comprising: a casing incorporating information input means; a display unit supported by the casing and including a display device having a screen for displaying information, and a box-shaped housing incorporating the display device and having a front wall having an opening exposing the screen and a rear wall opposing the front wall; first manual operating means provided on the rear wall and exposed; second manual operating means provided on the front wall of the box-shaped housing, exposed and facing away from the first manual operating means; and a reinforcing plate provided in the box-shaped housing and located between the first and second manual operating means, for receiving a pressure generated when the first manual operating means is operated. The first and second manual operating means and the reinforcing plate are supported by the rear wall, the reinforcing plate opposes the second manual operating means and spaced apart therefrom, forming a gap, and the front wall has a projection aligned with the second manual operating means and abutting on the reinforcing plate.

The reinforcing plate receives the pressure applied to the first manual operating means when the first manual operating means is operated. The reinforcing plate transmits the pressure to the rear wall of the housing. The reinforcing plate may be bent, and the twisting of the housing may be transmitted to the reinforcing plate. Nonetheless, the bending of the reinforcing plate or the twisting of the housing is hardly transmitted to the housing, because a gap is provided between the reinforcing plate and the second manual operating means.

Since the front wall of the cover is connected to the reinforcing plate by the projection, the reinforcing plate receives any pressure that is applied to the front wall of the housing. Therefore, the front wall is hardly bent or twisted, and the function of the second manual operating means is hardly influenced by an external. Hence, the reinforcing plate need not be designed to be more rigid, and is therefore simple in structure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 is a sectional view, showing the positional relationship between the cable guide and the casing; and FIG. 13 is a sectional view, taken along line 13—13 in FIG. 12.

DETAILED DESCRIPTION OF THE INVENTION

An embodiment of the present invention will be described with reference to the accompanying drawing.

Figure 1:
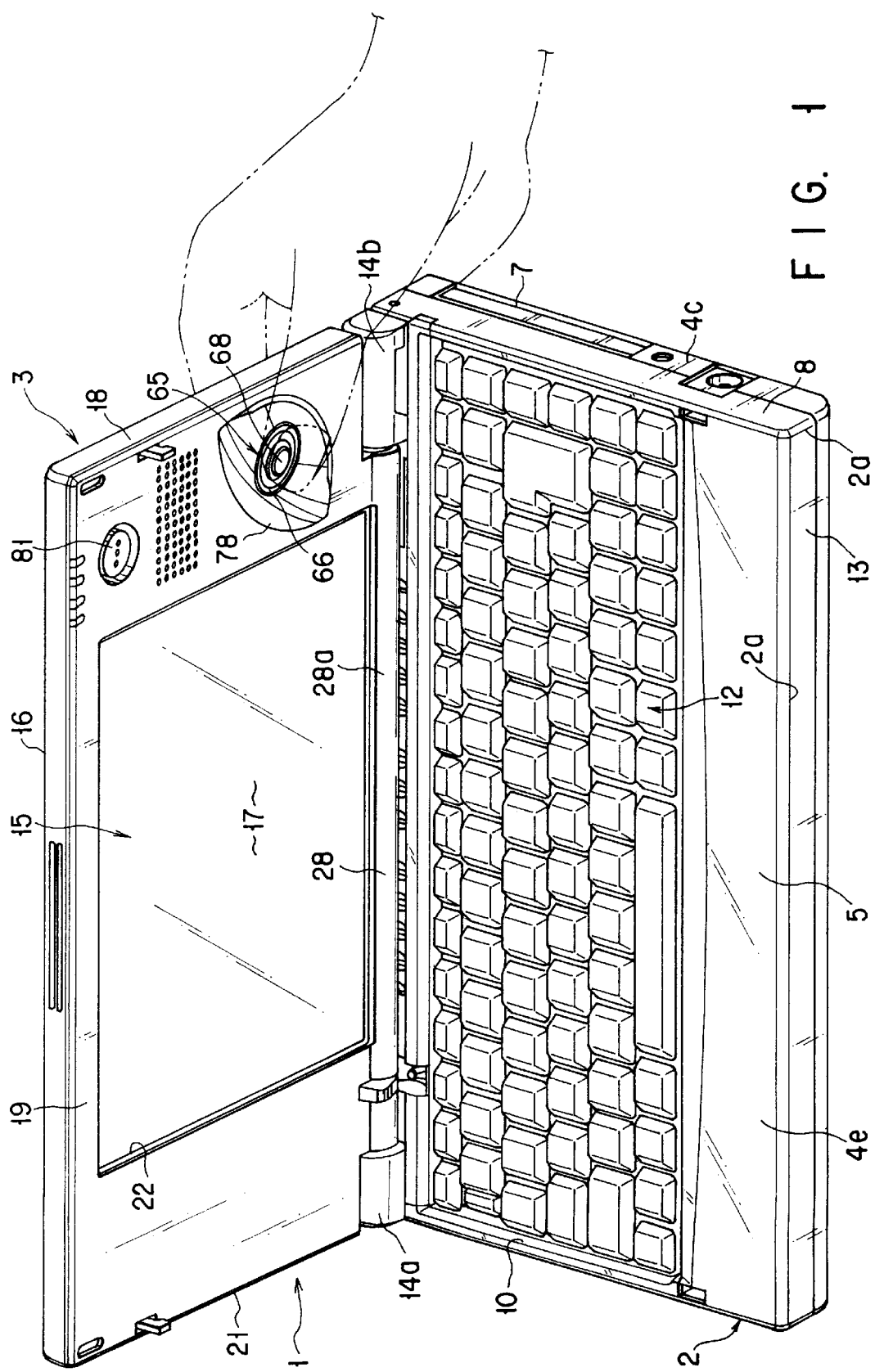
FIG. 1 is a perspective view of a portable computer according to the present invention, showing the display unit rotated to the first position so that the pointing stick can be operated.

FIG. 1 shows a portable computer 1 which is small enough to be put into a suit pocket. The computer 1 comprises a flat box-shaped casing 2 and a display unit 3 rotatably coupled to the casing 2.

The casing 2 is composed of a flat bottom wall 4*a*, a pair of side walls 4*b* and 4*c*, a rear wall 4*d*, and a top wall 4*e*. The side walls 4b and 4c extend upwards from and connected to, the left and right edges of the bottom wall 4a, respectively. The rear wall 4d is extend upwards from and connected to the rear edge of the bottom wall 4a. The top wall 4e is located above the bottom wall 4a and extends substantially parallel thereto. The front part of the top wall 4e serves as a flat palm rest 5.

Figure 4:
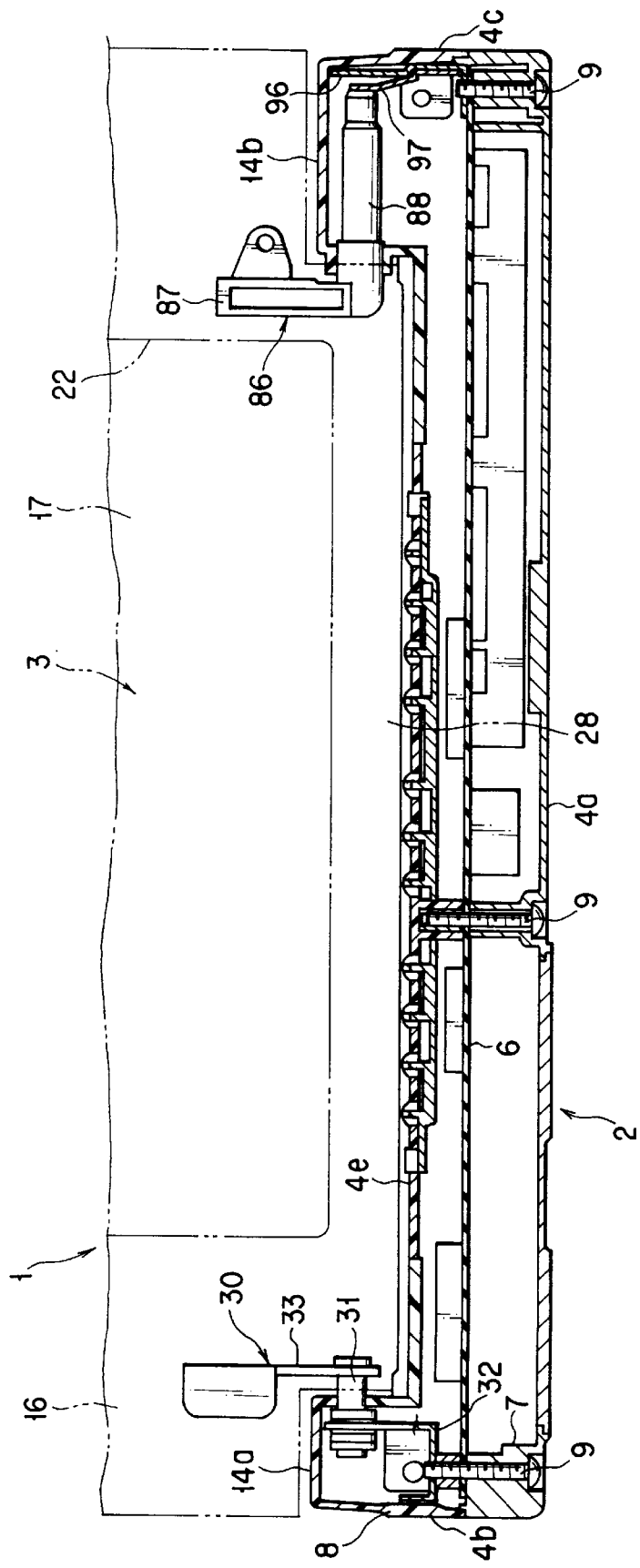
FIG. 4 is a sectional view of the casing of the computer.

As shown in FIGS. 1 and 4, the casing 2 comprises a lower casing 7 and an upper casing 8. The lower casing 7 includes the bottom wall 4a. The upper casing 8 includes the top wall 4e. The casings 7 and 8 can be separated from each other. The lower casing 7 is made of metal material having thermal conductivity, such as magnesium alloy. It has been made by means of so-called hybrid molding which is a combination of metal die casting and plastic injection molding. In the hybrid molding, a number of pellets of, for example, magnesium alloy are introduced into a cylinder and heated and stirred in the cylinder until they are made into magnesium alloy slurry. The slurry is injected into the cavity of a mold. The magnesium alloy slurry solidifies in the cavity, forming a desired molding, i.e., the lower casing 7. The upper casing 8 is made of synthetic resin such as ABS resin.

As shown in FIG. 1, the rear part of the top wall 4e, or the part other than the palm rest 5, serves as a keyboard mounting portion 10. A keyboard 12 is mounted on the keyboard mounting portion 10.

The casing 2 has a battery receptacle 2a. The battery receptacle 2a is located below the palm rest 5 and extends in the widthwise direction of the casing 2. Removably set in the receptacle 2a is a battery pack 13. The battery pack 13 is used to drive the computer 1 when the computer 1 is used in a place where no commercial AC power supply is available.

As is shown in FIG. 4, a circuit board 6 is provided in the casing 2. The circuit board 6 is fastened to the bottom wall 4a of the lower casing 7 by a plurality of screws 9. The keyboard 12 and the battery pack 13 are electrically connected to the circuit board 6.

Figure 2:
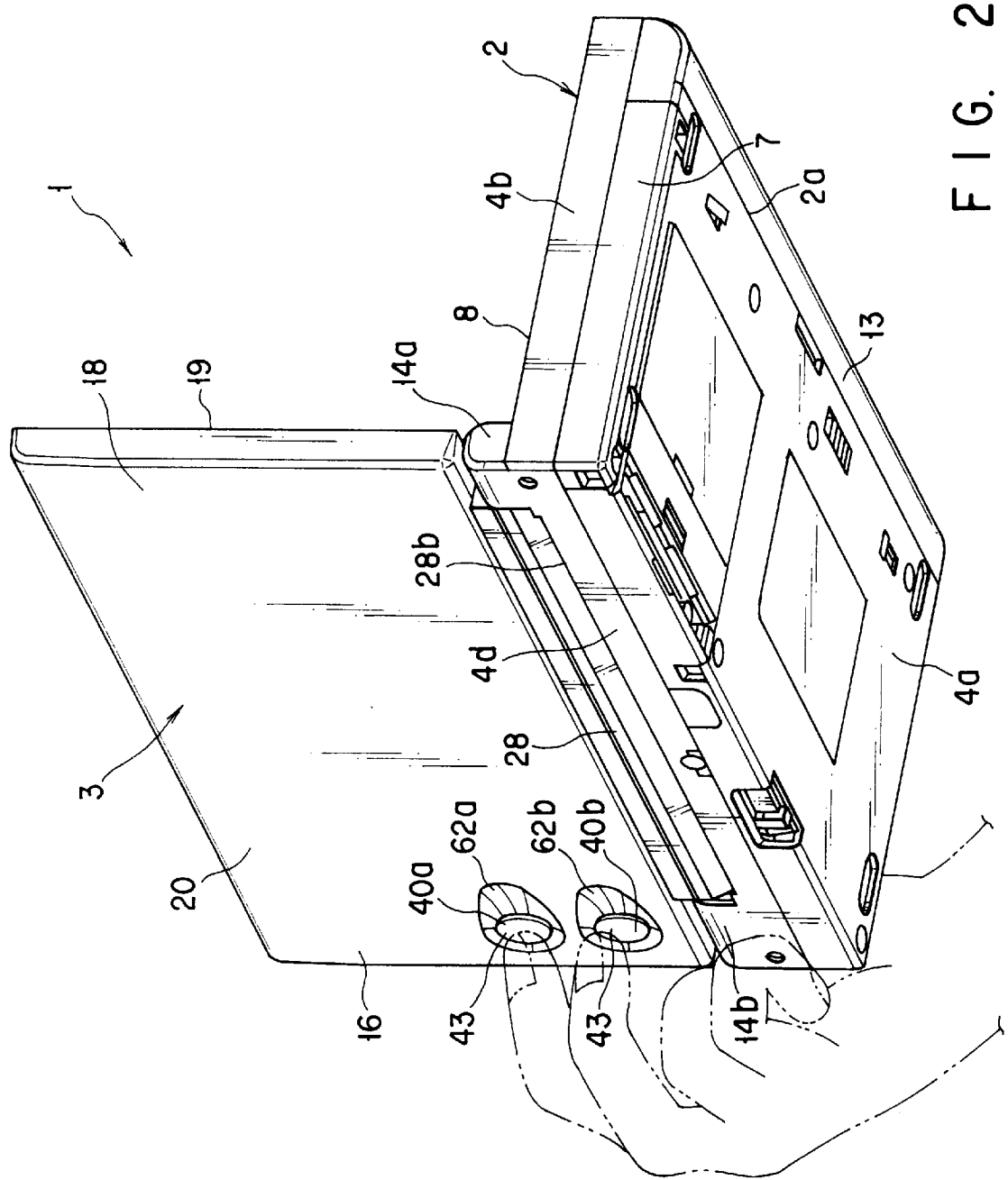
FIG. 2 is a perspective view of the computer, showing the display unit rotated to the first position and explaining how the click switch button is operated with the forefinger and middle finger.
Figure 3:
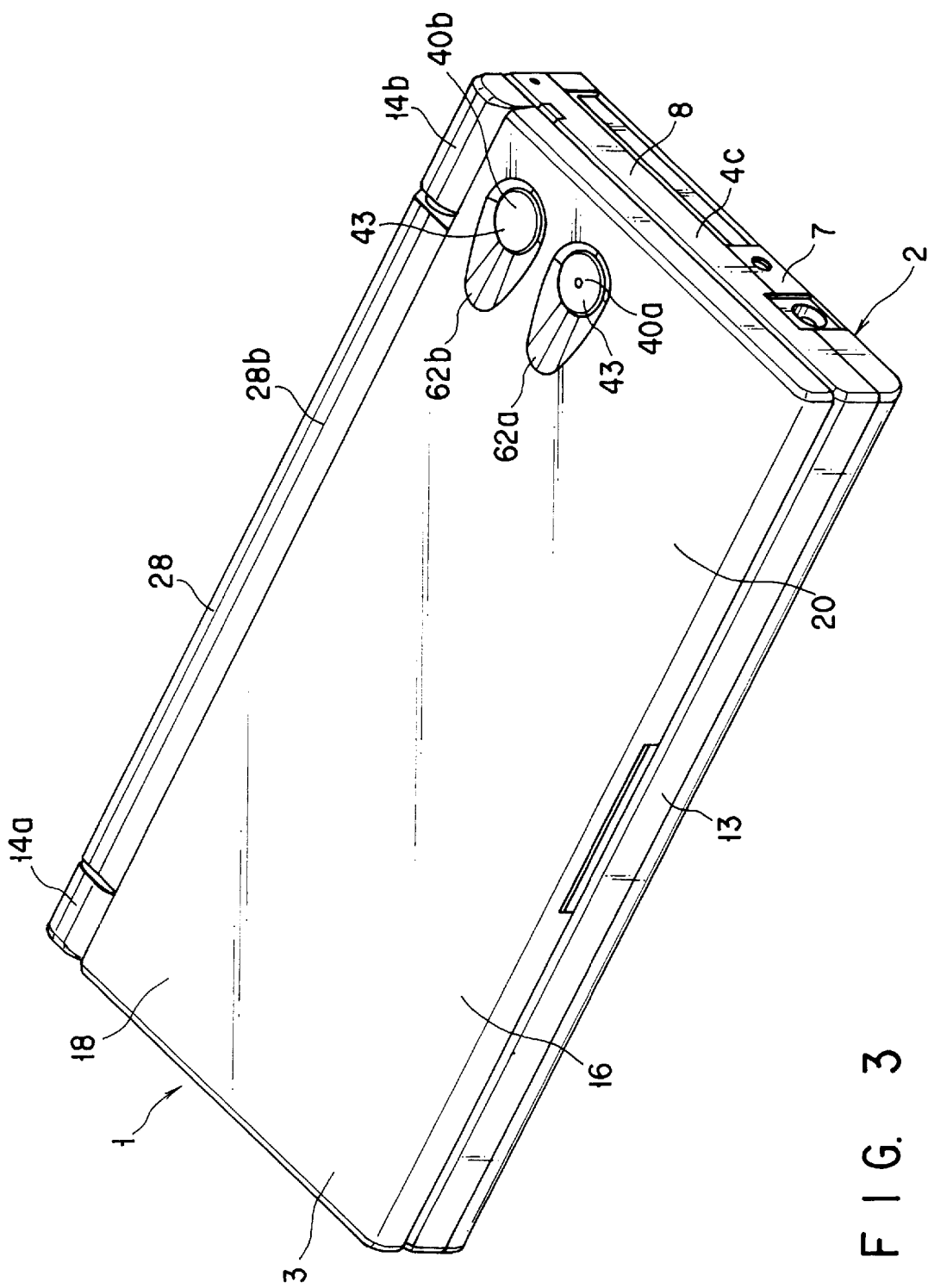
FIG. 3 is a perspective view of the portable computer, showing the display unit rotated to the second position.

As seen from FIGS. 1 to 3, two display-holding sections 14a and 14b are fastened to the rear end of the top wall 4e. These sections 14a and 14b are spaced part in the widthwise direction of the casing 2. They connect the display unit 3 to the casing 2.

The display unit 3 comprises a color liquid-crystal display (LCD) 15 and a flat box-shaped housing 16 incorporating the LCD 15. The LCD 15 has a rectangular screen 17 for displaying characters, images and the like. The housing 16 comprises an LCD cover 18 and an LCD mask 19. The LCD cover 18 and the LCD mask 19 are coupled with each other.

The LCD cover 18 is made of metal material having thermal conductivity, such as magnesium alloy. Like the lower casing 7, the cover 18 has been made by means of hybrid molding, i.e., a combination of metal die casting and plastic injection molding. The cover 18 has a rear wall 20, or a first wall. The rear wall 20 has substantially the same size as the top wall 4e of the casing 2. The LCD 15 is fastened to the middle part of the rear wall 20 by screws.

The LCD mask 19 is made of synthetic resin such as ABS resin. The mask 19 has a front wall 21, or a second wall. The second wall 21 has substantially the same size as the rear wall 20. The front wall 21 has a rectangular opening 22, through which the screen 17 of the LCD 15 is exposed.

Figure 5:
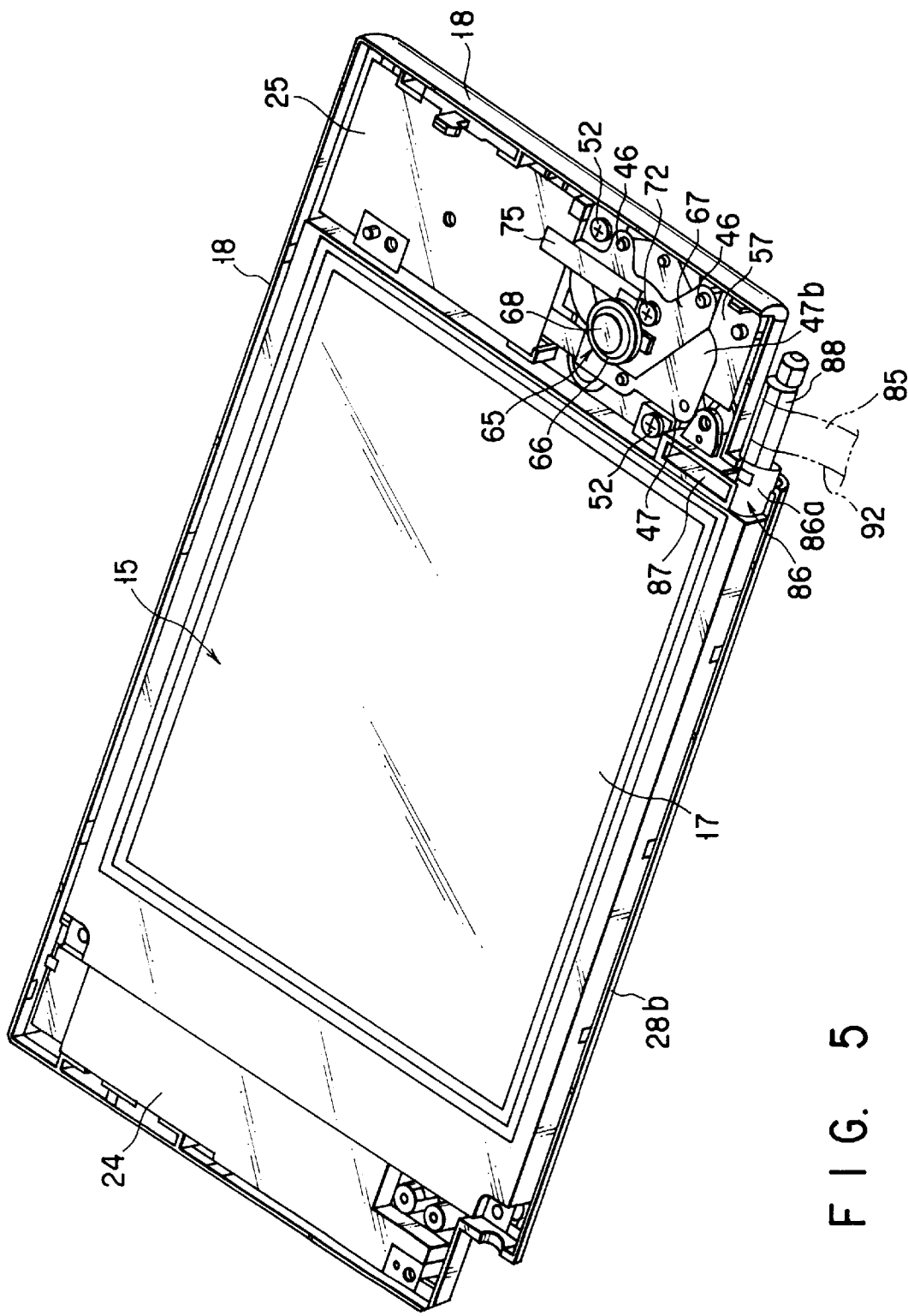
FIG. 5 is a perspective view of the LCD cover of the display unit, showing the color LCD and the pointing device which are mounted on the LCD cover.

As shown in FIG. 5, two circuit boards 24 and 25 are provided in the LCD cover 18. The first circuit board 24 has an inverter circuit provided for the back light of the color LCD 15. The circuit boards 24 and 25 are located in the left-side part and right-side part of the LCD 15, respectively. They are fastened by screws to the rear wall 20 of the LCD cover 18. The rear wall 20 of the LCD cover 18 and the front wall 21 of the LCD mask 18 conceal both circuit boards 24 and 25.

As shown in FIG. 1, the housing 16 has a coupling section 28 at its lower edge. The coupling section 28 extends in the widthwise direction of the housing 16. The coupling section 28 is composed of a front half 28a and a rear half 28b. The front half 28a is connected to the front wall 21 of the LCD mask 19, whereas the rear half 28b is connected to the rear wall 20 of the LCD cover 18. The front half 28a and the rear half 28b abut on each other. The color LCD 15 has its one end portion located between the front and rear halves 28a and 28b of the coupling section 28.

As shown in FIG. 4, the coupling section 28 is located between the display-holding sections 14a and 14b. The section 28 has its left end connected to the casing 2 by a hinge device 30. The hinge device 30 comprises a shaft 31 and two brackets 32 and 33. The shaft 31 extends horizontally, between the coupling section 28 and the first display-holding sections 14a. The shaft 31 consists of a first end portion inserted in the first display-holding section 14a and a second end portion inserted in the coupling section 28 of the housing 16. The first bracket 32 is rotatably coupled to the first end portion of the shaft 31, located in the casing 2 and fastened to the lower casing 7 by screws. The second bracket 33 is fixed to the second end portion of the shaft 32, located in the housing 16 of the display unit 3 and fastened to the rear wall 20 by screws. The display unit 3 is thus supported on the casing 2 and can rotate around the shaft 31, between a first position and a second position. When rotated to the first position, the unit 3 covers the palm rest 5 and the keyboard 12. When rotated to the second position, the unit 3 exposes the palm rest 5 and the keyboard 12.

While the display unit 3 remains in the first position as shown in FIG. 3, the LCD cover 18 made of metal and hence rigid is located above the LCD mask 19, forming the top of the housing 16. Further, the lower casing 7 forming the bottom of the casing 2 is made of metal and rigid. Hence, while the display unit 3 remains in the first position, the metal parts form almost all of the outer shell of computer 1. In this condition, the outer shell of the computer 1 can withstand a pressure which may be externally exerted to it while the computer 1 is being transported. Thus, the casing 2 and the display unit 3 are very unlikely to be broken.

While the display unit 3 remains in the second position as shown in FIG. 1, the screen 17 and the front wall 21 stand upwards at the back of the keyboard 12. Thus, the screen 17 faces the user.

As shown in FIGS. 2 and 3, two click switch buttons 40a and 40b (first manual operating means) are mounted on the rear wall 20 of the LCD cover 18. The click switch buttons 40a and 40b are operated to execute and disable a command. They are positioned on the right-side part of the rear wall 20. They are located one above the other while the display unit 3 remains in the first position. Hence, the user can operate the buttons 40a and 40b with the forefinger or middle finger of the right hand.

Figure 6:
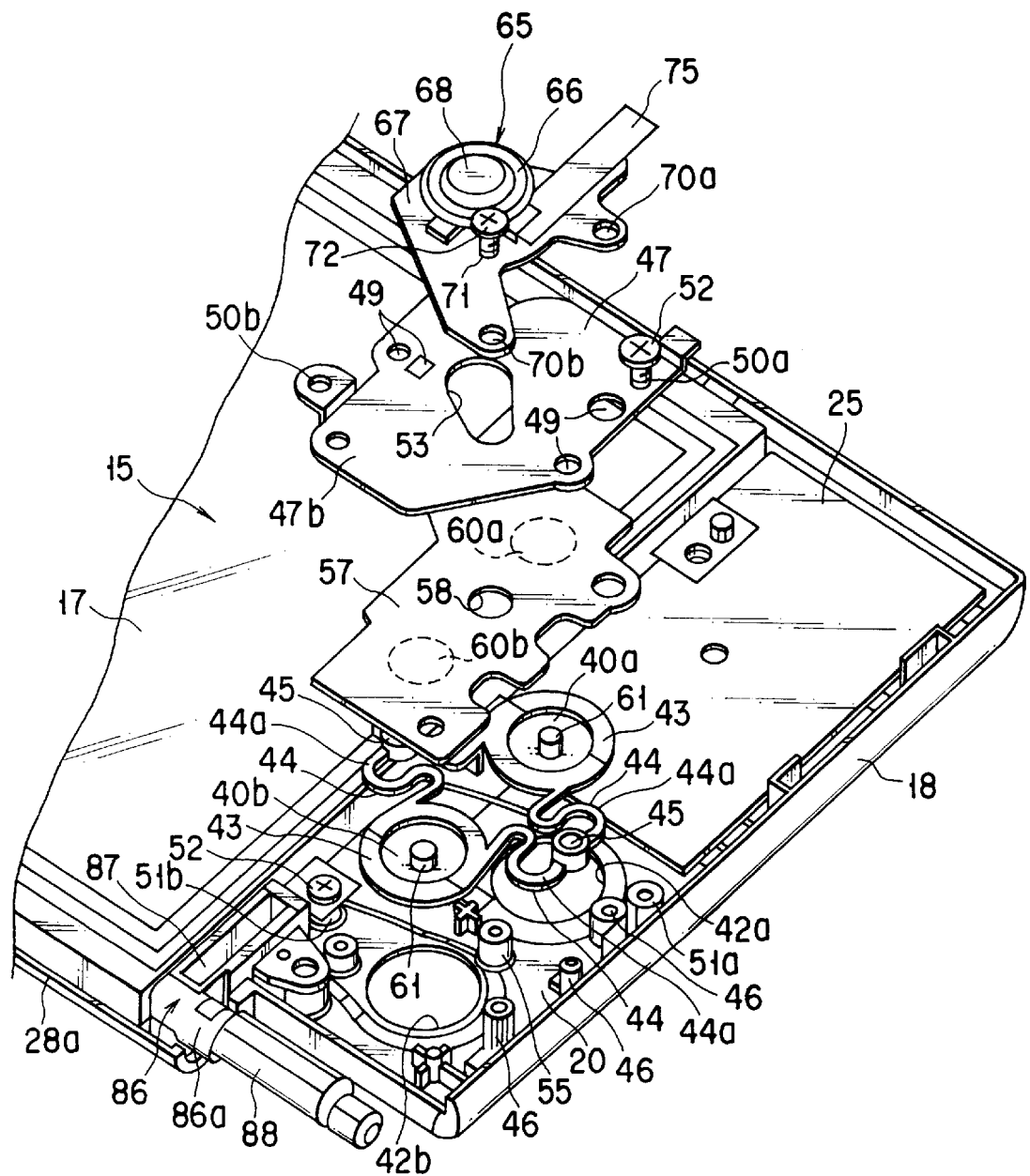
FIG. 6 is an exploded view of the display unit, illustrating the positional relationship among the LCD cover, click switch button, switch plate and pointing device.

As seen from FIG. 6, the rear wall 20 has two through holes 42a and 42b in the right-side part. The holes 42a and 42b are located below the second circuit board 25. The click switch buttons 40a and 40b are inserted in the holes 42a and 42b, respectively, from the inner surface of the LCD cover 18.

The click switch buttons 40a and 40b are made of synthetic resin. The buttons 40a and 40b have a load-receiving discs 43. The discs 43 of the buttons 40a and 40b are connected by a pair of connectors 44. Each connector 44 has two S-shaped elastic member 44a connected together and a hollow cylindrical boss 45 at the junction of the elastic members 44a. The bosses 45 are respectively mounted on two of projections 46 which protrude from the inner surface of the rear wall 20. The click switch buttons 40a and 40b are thereby secured to the LCD cover 18. The S-shaped elastic members 44a of either connector 44 are located between the click switch buttons 40a and 40b. Hence, the click switch buttons 40a and 40b are held on the LCD cover 18 and can yet move into and from the interior of the housing 16.

Figure 7:
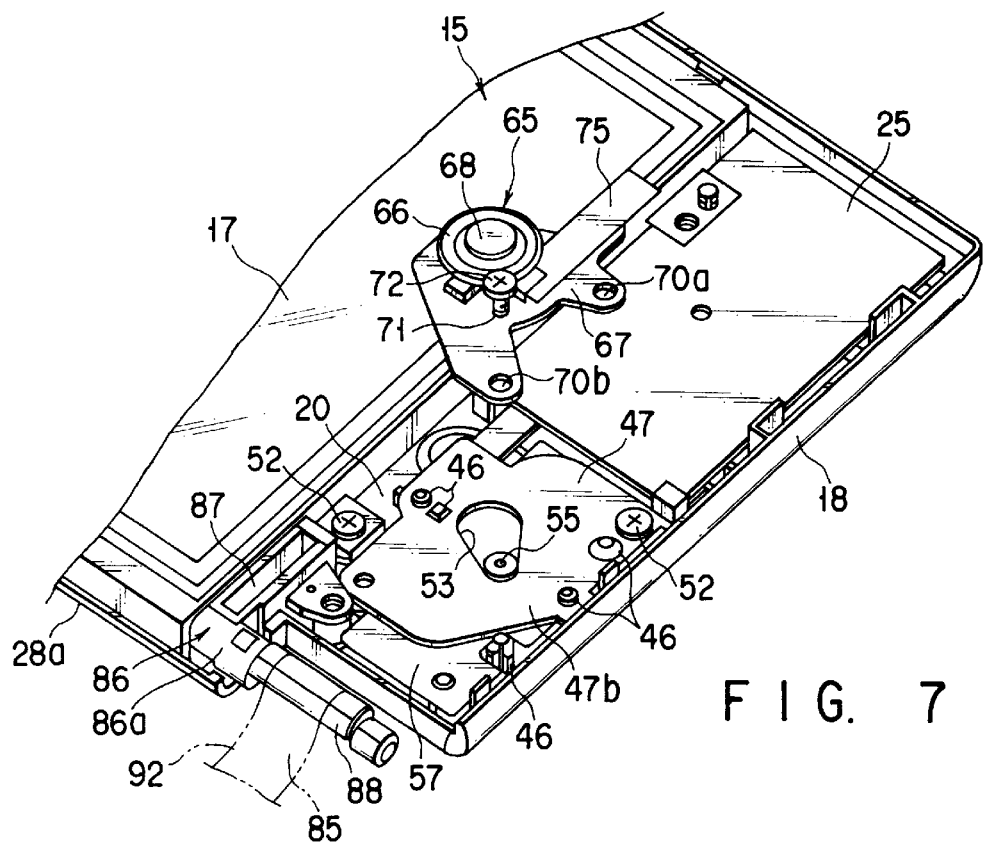
FIG. 7 is a perceptive view representing the positional relationship between the switch plate and the pointing device.
Figure 9:
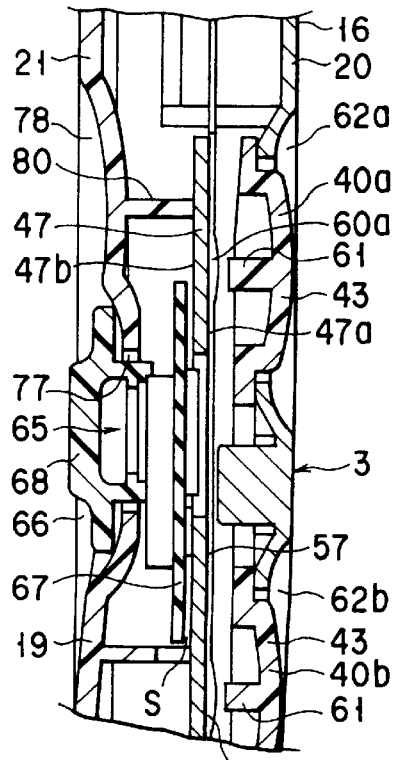
FIG. 9 is a sectional view of the housing of the display unit, showing the pointing device and the click switch button which are attached to the housing.

As illustrated in FIGS. 6, 7 and 9, a switch plate (or a reinforcing plate) 47 is provided in the LCD cover 18. The switch plate 47 is made of metal. The plate 47 has a plurality of engagement holes 49 and two through holes 50a and 50b, all made in the peripheral portion. Fitted in the engagement holes 49 are the projections 46 protruding from the rear wall 20 of the LCD cover 18. The switch plate 47 is therefore secured to the LCD cover 18.

The through holes 50a and 50b of the switch plate 47 are aligned with two seats 51a and 51b provided on the inner surface of the rear wall 20. The seats 51a and 51b have a screw hole each. Two screws 52 pass the holes 50a and 50b and are set in the screw holes of the seats 51a and 51b, respectively. The switch plate 47 is thereby fastened to the rear wall 20 of the LCD cover 18.

The switch plate 47 is an elongated through hole 53 in its center part. A seat 55 protrudes from the inner surface of the rear wall 20. The seat 55 is taller than the seats 51a and 51b. It passes through the hole 53 and a little extend upwards from the switch plate 47.

As FIG. 9 shows, the switch plate 47 has a first surface 47a and a second surface 47b facing away from the first surface 47a. The first surface 57a opposes the click switch buttons 40a and 40b. The second surface 47b opposes the front wall 21 of the LCD mask 19. A circuit board 57 is laid upon the first surface 47a of the switch plate 47. This circuit board 57 is electrically connected to the second circuit board 25. The circuit board 57 has a through hole 58 made in the center part. The seat 55 passes through the hole 58 and extends upwards from the circuit board 57.

Two click switches 60a and 60b are arranged on the circuit board 57. The switches 60a and 60b oppose the load-receiving discs 43 of the click switch buttons 40a and 40b, respectively. Extending upwards from the discs 43 are two projections 61 for pushing the click switches 60a and 60b. When the user pushes the disc 43 of the button 40a with the forefinger or the middle finger, the projection 61 abuts on the click switch 60a, turning on the same. Similarly, when the user pushes the disc 43 of the button 40b with the forefinger or the middle finger, the projection 61 abuts on the click switch 60b, turning on the same. The pressure applied to either disc 43 is transmitted to the LCD cover 18 through the projection 61 and the switch plate 47.

As shown in FIGS. 2, 3 and 9, the rear wall 20 of the LCD cover 18 has two guide recesses 62a and 62b which are aligned with the click switch buttons 40a and 40b, respectively. The recesses 62a and 62b have a curved surface each, for receiving the tip of either the forefinger or the middle finger. The load-receiving discs 43 of the click switch buttons 40a and 40b are located in the center parts of the guide recesses 62a and 62b. Once the user places the tips of the forefinger and middle fingers in the recess 62a and 62b, he or she needs only to move the finger tips along the curved surfaces of the recess, to reach the load-receiving discs 43. The user can therefore operate the click switch buttons 40a and 40b, though he or she cannot see the button 40a or 40b, which are exposed at the back of the housing 16.

As shown in FIG. 1, a pointing device (second manual operating means) 65 is arranged on the right-side part of the front wall 21 of the housing 16. The pointing device 65 is designed to move a pointer displayed on the screen 17, to any desired position in the screen 17. The device 65 faces the user as long as the display unit 3 stays in the first position. The user can therefore operate the pointing device 65 with the thumb of his or her right hand.

Figure 8:
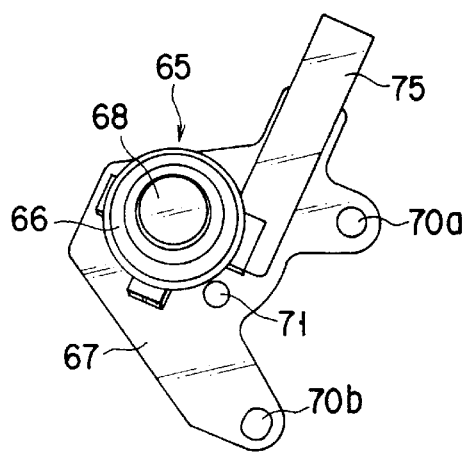
FIG. 8 is a plan view of the pointing device.

As seen from FIGS. 6 to 8, the pointing device 65 comprises a pointing stick 66 and a support plate 67. The plate 67 is made of metal and supports the pointing stick 66. The stick 66 has a rigid load-receiving disc 68. The disc 68 is fixed to the support plate 67 and immovable with respect to the plate 67. The stick 66 has an element (not shown) for detecting the strain generated when the user pushes the disc 68 with the finger tip. The strain-detecting element is located near the load-receiving disc 68. The support plate 67 is electrically connected to the second circuit board 25 by a flexible printed circuit board 75.

The support plate 67 is smaller than the switch plate 47. It opposes the second surface 47b of the switch plate 47. It has two positioning holes 70a and 70b and one through hole 71. Fitted in the positioning holes 70a and 70b are two of projections 46 which protrude from the inner surface of the rear wall 20. The support plate 67 is thereby secured to the rear wall 20 of the LCD cover 18. The through hole 71 is located near the load-receiving disc 68 and axially aligned with the through hole 53 of the switch plate 47. A screw 72 passes through the hole 71 and set in screw engagement with the seat 55 provided on the inner surface of the rear wall 20. The support plate 67 of the pointing device 65 is thereby pressed onto the seat 55 and fastened to the rear wall 20 of the LCD cover 18.

As mentioned above, the seat 55 passes through the hole 53 and a little extend upwards from the switch plate 47. Therefore, a gap S of about 0.5 to 0.6 mm is provided between the switch plate 47 and the support plate 67 as is illustrated in FIG. 9. This means that the switch plate 47 and the pointing device 65 are independently secured to the LCD cover 18. The pointing device 65 is positioned in back-to-back relationship with the click switch buttons 40a and 40b.

Figure 10:
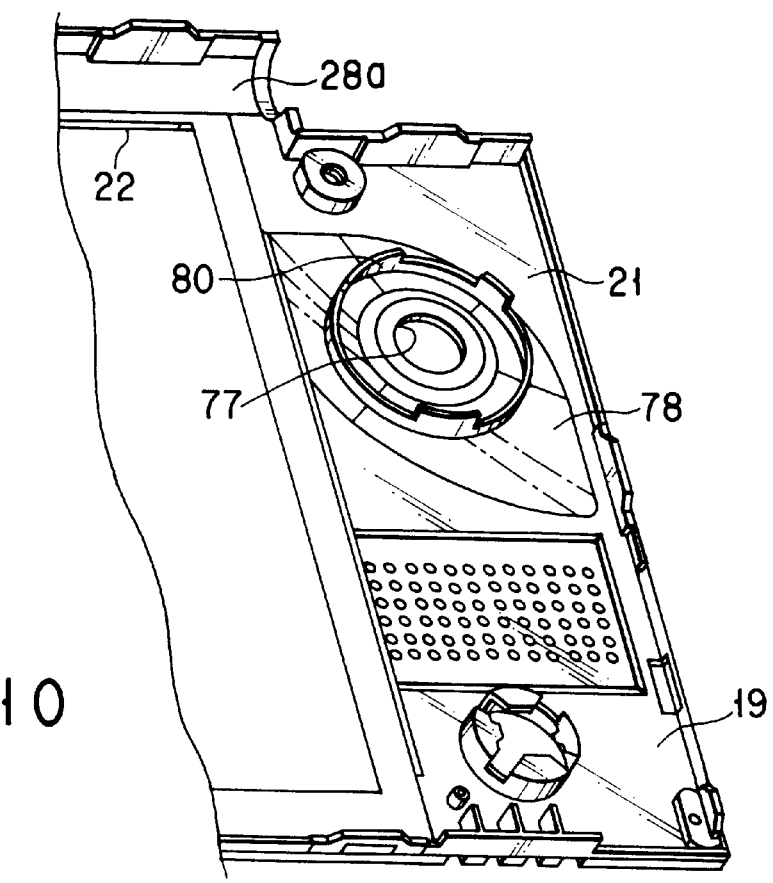
FIG. 10 is a perspective view of the LCD mask, showing the inner surface thereof.

As shown in FIG. 10, the front wall 21 of the LCD mask 19 has a through hole 77 in its right-side part. The hole 77 is located below the second circuit board 25. The load-receiving disc 68 of the pointing stick 66 is inserted in the through hole 77 of the front wall 21.

The front wall 21 of the LCD mask 19 has a guide recess 78. The recess 78 has a gently curved surface for receiving the tip of the thumb of the user's right hand. The load-receiving disc 68 of the pointing stick 66 is located in the center part of the recess 78. Once the user places the tip of the thumb in guide recess 78, he or she needs only to move the thumb along the curved surface of the recess 78, to reach the load-receiving disc 68.

As seen from FIGS. 9 and 10, a hollow cylindrical projection 80 protrudes from the inner surface of the front wall 21. The projection 80 surrounds the load-receiving disc 68 of the pointing stick 66. The distal end of the projection 80 abuts on the second surface 47b of the switch plate 47.

As FIG. 1 shows, the main switch 81 of the computer 1 is provided on the front wall 21 of the LCD mask 19. The main switch 81 is located adjacent to the load-receiving disc 68 of the pointing device 65. The switch 81 is secured to the second circuit board 25.

The circuit boards 24 and 25, both provided in the display unit 3, are connected to the circuit board 6 provided in the casing 2, by means of a cable 85. The cable 85 is a flexible printed circuit board. The cable 85 extends from the right side of the coupling section 28 of the housing 16 into the casing 2 through the interior of the second display-holding section 14b.

As shown in FIGS. 5 and 6, a cable guide 86 made of synthetic resin is attached to the rear wall 20 of the LCD cover 18. The guides 86 defines the path which the cable 85 extends between the right side of the coupling section 28 and the second display-holding section 14b. The cable guide 86 comprises a box-shaped first guide section 87 and shaped like a hollow cylindrical second guide section 88. The sections 87 and 88 are formed integral with each other. The cable 85 passes through the first and second guide sections 87 and 88.

The first guide section 87 is fastened by screws to the rear wall 20 of the LCD cover 18 and located on the right-side part of the color LCD 15. The cable guide 86 has a corner portion 86a which is defined by the first and second guide sections 87 and 88. The corner portion 86a is positioned at the coupling section 28 of the housing 16. The second guide section 88 passes through the right side of the coupling section 28 and horizontally extends outwards from the housing 16. The second guide section 88 is positioned in axial alignment with the shaft 31 of the hinge device 30.

As illustrated in FIG. 12, the right side of the coupling section 28 opposes the side of the second display-holding section 14b. The section 14b has a hole 90 in its side. A greater part of the second guide section 88 is fitted in this hole 90, and the section 88 can rotate with respect to the second display-holding section 14b. The second guide section 88 has a slit 91 which opens to the interior of the housing 12 as shown in FIGS. 11 and 13.

As seen from FIG. 13, the cable 85 is folded in the second guide section 88. The cable 85 has a band-shaped extension 92. The extension 92 is pulled out of the guide section 88 through the slit 91. The extension 92 is coiled, making several turns, and guided into the interior of the casing 2. The extension 92 has a terminal 92a at its distal end. The terminal 92a is electrically connected to the circuit board 6 by a display connector 93. The cable guide 86 is plated with an electrically conductive layer 94. The layer 94 surrounds that part of the cable 85 which extends between the coupling section 28 of the housing 16 and the second display-holding section 14b.

As shown in FIG. 12, the distal end of the second guide section 88 is located adjacent to the right side wall 4c of the casing 2. Arranged inside the side wall 4c is a reinforcing panel 96 made of metal. The panel 96 is fastened to the circuit board 6 by the screws 9. The panel 96 contacts a ground-wiring layer (not shown) which is provided on the circuit board 6.

Figure 11:
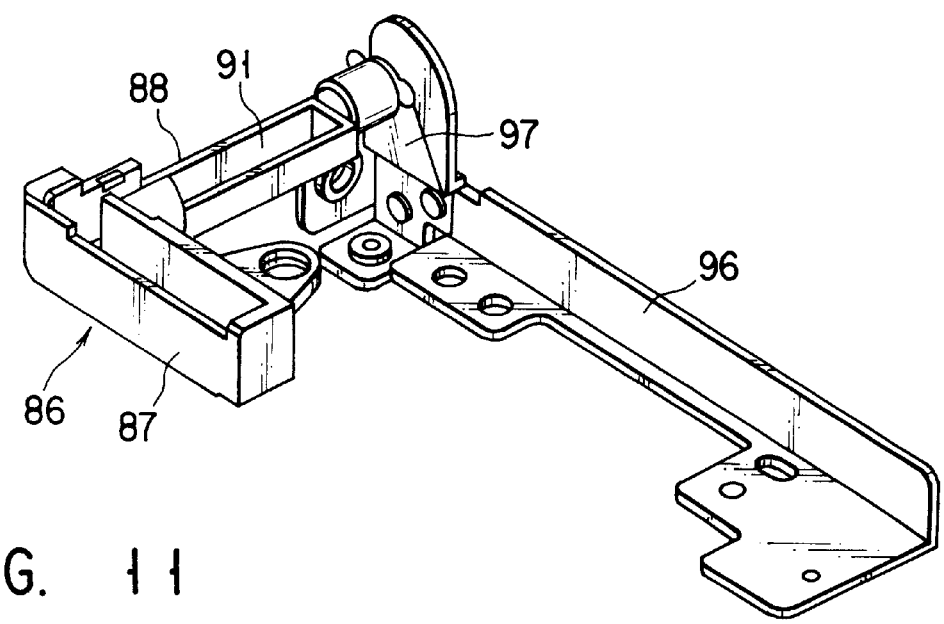
FIG. 11 is a perspective view of the cable guide and the ground spring, both provided on the display unit.

As shown in FIG. 11, a ground spring 97 made of metal is connected to the reinforcing panel 96. The distal end of the ground spring 97 contacts the distal end of the second guide section 88. The plated layer 94 which surrounds the cable 85 is thereby connected to the ground. The layer 94 shields the cable 85 through which signals are supplied at high speed and which extends between the casing 2 and the display unit 3.

In order to operate the computer 1 described above, the user rotates the display unit 3 from the first position to the second position. Now that the display unit 3 stands upwards from the rear end of the casing 2, the click switch buttons 40a and 40b and the pointing stick 66 can be operated.

The user places the tips of the forefinger and middle finger of his or her right hand in the guide recesses 62a ad 62b of the housing 16, respectively, and plates the tip of the thumb of the right hand in the guide recess 78 of the housing 16. The finger tips fit well in the recesses 62a, 62b and 78 because the recesses have a gently curved surface each. Since the load-receiving discs 43 of the buttons 40a and 40b and the load-receiving disc 68 of the stick 66 are located in the center parts of the guide recesses 62a, 62b and 78, the user needs only to move the finger tips along the curved surfaces of the recesses 62a, 62b and 78, to reach the load-receiving discs 43 and 68. The user can therefore operate the buttons 40a and 40b and stick 66 quite easily.

As the user depresses the load-receiving discs 43 of the click switch buttons 40a and 40b, the elastic members 44a of the connectors 44 are deformed. The discs 43 are thereby pushed into the casing 2 by a predetermined stroke. As a result, the projections 61 of the discs 43 abut on the click switches 60a and 60b, respectively, turning on the switches 60a and 60b.

When the projections 61 abut on the switches 60a and 60b, the pressures applied to the click switch buttons 40a and 40b are exerted on the switch plates 47. This is because the circuit board 57 on which the switches 60a and 60b are mounted is laid upon the switch plate 47. The switch plate 47 transmits the pressures to the LCD cover 18 which is made of metal.

As indicated above, the pointing device 65 is positioned in back-to-back relationship with the click switch buttons 40a and 40b, and the switch plate 47 is located between the device 65 and the buttons 40a and 40b. When the switch plate 47 is bent as it receives a high pressure, the strain-detecting element built in the pointing stick 66 may detect the bending as a strain. If this happens, the pointer will inevitably be moved on the screen 17 of the LCD 15.

Nevertheless, the bending of the switch plate 47 is absorbed in a gap S is provided between the switch plate 47 and the support plate 67 holding the the stick 66. No pressure will therefore be transmitted from the switch plate 47 to the support plate 67. The function of the strain-detecting element will not be influenced, and the pointer will not erroneously move on the screen 17 of the LCD 15.

The switch plate 47 need not be reinforced at all by, for example, forming ribs integral with the plate 47. This renders it easy to position the pointing stick 66 in back-to-back relationship with the click switch buttons 40a and 40b.

Made of metal, the LCD cover 18 is rigid; it supports the click switch buttons 40a and 40b, pointing device 65 and switch plate 47 steadfastly. In addition, the cover 18 is rigid enough to overcome the pressure applied to it through the switch plate 47 when the click switch buttons 40a and 40b are depressed. Overcoming that pressure, the LCD cover 18 is not twisted at all. The function of the strain-detecting element will not be influenced, preventing the pointer from moving erroneously on the screen 17 of the LCD 15.

While operating the computer 1, the user usually pushes the click switch buttons 40a and 40b with the forefinger and the middle finger after operating the pointing stick 66 with the thumb. In this case, the user pinches the housing 16, placing the tip of the thumb in the guide recess 78 made in the front wall 21 and the tips of the forefinger and middle finger in the guide recesses 62a and 62b made in the rear wall 20. When the housing 16 is thus pinched, a pressure is applied on the front wall 21 supporting the pointing 66, to twist or deform the front wall 21.

The front wall 21 would not be twisted or deformed, nonetheless. As mentioned above, the hollow cylindrical projection 80 protrudes from the inner surface of the front wall 21, surrounding the load-receiving disc 68 of the pointing stick 66 and abutting, at its distal end, on the switch plate 47. The switch plate 47 therefore absorbs the pressure applied to the front wall 21. That part of the front wall 21 which opposes the load-receiving disk 68 and which supports the pointing stick 66 is neither twisted nor deformed. Should any other part of the front wall 21 be twisted, the strain-detecting element provided in the stick 66 would not detect this twisting. Thus, the pointer would not move erroneously on the screen 17 of the LCD 15.

In the embodiment described above, the LCD cover of the display unit is made of metal. The LCD cover may, nevertheless, be made of synthetic resin like the LCD mask.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable information-processing apparatus comprising:
    a housing having a first wall and a second wall opposing the first wall;
    first manual operating means provided in said housing and on said first wall and exposed;
    second manual operating means provided in said housing and on said second wall, exposed, facing away from said first manual operating means and spaced apart therefrom;
    a reinforcing plate located between said first and second manual operating means and supported on said first wall and configured for receiving a force generated when said first manual operating means is depressed from a first position to a second position; and
    wherein said first and second manual operating means are supported by said first wall, said reinforcing plate is spaced apart from the second manual operating means so as to define a gap having a width extending between said reinforcing plate and said second manual operation means, and said second wall has a projection protruding from an inner surface of said second wall into said housing and having a distal end extending adjacent to the gap so as to abut said reinforcing plate and substantially transmit the force that is generated when said first manual operating means is depressed between the first and second positions toward said second wall and away from the second manual operating means.

2. An apparatus according to claim 1, wherein said housing comprises a housing body including said first wall and a cover made of synthetic resin and including said second wall, said housing body is made of metal and more rigid than said cover.

3. An apparatus according to claim 1, wherein said first manual operating means comprises a load-receiving section for receiving a pressure generated when said first manual operating means is operated, a support section secured to said first wall, and a coupling section coupling the load-receiving section and the support section together and capable of being elastically deformed.

4. An apparatus according to claim 3, wherein said first wall has a first guide recess having a gently curved surface, and the load-receiving section of said first manual operating means is located at a substantially center part of said first guide recess.

5. An apparatus according to claim 1, wherein said second manual operating means comprises a load-receiving section for receiving a pressure generated when said second manual operating means is operated and a support plate made of metal and secured to said first wall, for supporting the load-receiving section, said support plate opposing said reinforcing plate and spaced apart therefrom, forming a gap.

6. An apparatus according to claim 5, wherein said first wall has first and second seats which protrude toward said second wall, said second seat is taller than said first seat, said support plate is secured to a distal end of said second seat, and said reinforcing plate is secured to a distal end of said first seat.

7. An apparatus according to claim 5, wherein said second manual operating means is a switch for detecting a strain generated when said load-receiving section receives a pressure.

8. An apparatus according to claim 5, wherein said projection is shaped like a hollow cylinder and surrounds said load-receiving section of said second manual operating means.

9. An apparatus according to claim 5, wherein said second wall has a second guide recess having a gently curved surface, the load-receiving section of said second manual operating means is located at a substantially center part of said second guide recess, and said projection is aligned with said second guide recess.

10. An apparatus according to claim 1, wherein the reinforcing plate supports a circuit board having a click switch, and the first manual operating means includes a load receiving disc supported on the first wall and connected to a projection that depresses the click switch when the load receiving disc moves the projection from a first position to a second position.

11. An apparatus according to claim 1, wherein the second manual operating means includes a pointing stick operatively connected to a load receiving disc and a strain gage for detecting strain exerted on the load receiving disc by the pointing stick, and a support plate supporting the load receiving disc and electrically connected to a circuit board.

12. An apparatus according to claim 1, wherein:
    the reinforcing plate supports a first circuit board having a click switch and the first manual operating means includes a load receiving disc supported on the first wall and connected to a projection that depresses the click switch when the load receiving disc moves from a first position to a second position; and
    the second manual operating means includes a pointing stick operatively connected to a load receiving disc and a strain gage for detecting strain exerted on the load receiving disc by the pointing stick, and a support plate supporting the load receiving disc and electrically connected to a second circuit board.

13. An apparatus according to claim 12, wherein said projection protruding from said inner surface of said second wall and abutting said reinforcing plate substantially prevents the reinforcing plate from bending across the width of the gap when the load receiving disc of the first manual operating means moves from the first position to the second position.

14. An apparatus according to claim 12, wherein said projection protruding from said inner surface of said second wall supports the reinforcing plate such that the strain gage of the second manual operating means does not detect a force received by the click switch of the first manual operating means when the first manual operating means is depressed from the first position to the second position.

15. A portable information-processing apparatus comprising:
- a housing including a housing body having a first wall and a cover coupled to the housing body and having a second wall opposing the first wall;
- a first manual operating device provided in said housing and on said first wall and exposed;
- a second manual operating device provided in said housing and on said second wall, exposed, facing away from said first manual operating device, and spaced away therefrom;
- a reinforcing plate located between said first and second manual operating devices for receiving a pressure generated when said first manual operating device is operated by being moved from a first position to a second position;
- wherein said reinforcing plate and said first and second manual operating devices are supported by said first wall, and said reinforcing plate opposes said second manual operating device and is spaced therefrom so as to define a gap having a width preventing said reinforcing plate from contacting said second manual operation device, and said second wall has a projection aligned with said second manual operating device so as to protrude into said housing from an inner surface of said second wall, and having a distal end extending adjacent to the gap so as to abut said reinforcing plate and prevent the second wall from bending toward the reinforcing plate when the first manual operating device is operated by being moved between the first and second positions.

16. An apparatus according to claim 15, wherein said cover is made of synthetic resin and said housing body is made of metal and more rigid than said cover.

17. An apparatus according to claim 16, wherein said second manual operating means comprises a load-receiving section for receiving a pressure generated when said second manual operating means is operated and a support plate secured to said first wall, for supporting the load-receiving section, said support plate opposes said reinforcing plate and spaced apart therefrom, forming a gap, and said projection is shaped like a hollow cylinder and surrounds said load-receiving section.

18. An apparatus according to claim 15, wherein:
- the reinforcing plate supports a first circuit board having a click switch and the first manual operating device includes a load receiving disc supported on the first wall and connected to a projection that depresses the click switch when the load receiving disc moves from a first position to a second position; and
- the second manual operating device includes a pointing stick operatively connected to a load receiving disc and a strain gage for detecting strain exerted on the load receiving disc by the pointing stick, and a support plate supporting the load receiving disc and electrically connected to a second circuit board.

19. An apparatus according to claim 18, wherein said projection protruding from said inner surface of said second wall and abutting said reinforcing plate substantially prevents the reinforcing plate from bending across the width of the gap when the load receiving disc of the first manual operating device moves from the first position to the second position.

20. An apparatus according to claim 18, wherein said projection protruding from said inner surface of said second wall supports the reinforcing plate such that the strain gage of the second manual operating device does not detect a force received by the click switch of the first manual operating device when the first manual operating device is depressed from the first position to the second position.

21. A portable information-processing apparatus comprising:
- a housing having a first wall and a second wall opposing the first wall;
- a manually operable push button supported on said first wall so as to be exposed outside said housing and configured to generate a force when the push button is moved between a first position and a second position spaced away from the first position;
- a manual pointing device having a pointing stick and a support plate and configured to detect a strain exerted on the pointing stick in the form of distortion of the pointing stick, said pointing stick being one exposed outside said housing, facing away from said push button, and arranged on said second wall, and said support plate being one made of metal, supporting said pointing stick, and located in said housing; and
- a reinforcing plate, supported by said first wall in said housing, located between said push button and said pointing device so as to define a gap having a width separating said reinforcing plate from said support plate of said pointing device, and configured to receive said force generated when said push button is moved between the first and second positions, and distribute said force away from said pointing device.

22. An apparatus according to claim 21, wherein:
- the reinforcing plate supports a first circuit board having a click switch and the manually operable push button includes a load receiving disc supported on the first wall and connected to a projection that depresses the click switch when the load receiving disc moves from a first position to a second position; and
- the pointing stick of the manual pointing device is operatively connected to a load receiving disc and a strain gage for detecting strain exerted on the load receiving disc by the pointing stick, and said support plate supports the load receiving disc and is electrically connected to a second circuit board.

23. An apparatus according to claim 22, further comprising a projection protruding from said inner surface of said second wall and having a distal end extending adjacent to the gap so as to abut said reinforcing plate and substantially prevent the reinforcing plate from bending across the width of the gap when the load receiving disc of the manually operable push button moves from the first position to the second position.

24. An apparatus according to claim 22, further comprising a projection protruding from said inner surface of said second wall and having a distal end extending adjacent to the gap so as to support said reinforcing plate and prevent the strain gage of said manual pointing device from detecting a force received by the click switch of the manually operable push button when the manually operable push button is depressed from the first position to the second position.

25. An apparatus according to claim 21, further comprising a projection protruding from the second wall and extending adjacent to the gap, the projection having a distal end abutting said reinforcing plate.

* * * * *